(12) United States Patent
Ramos

(10) Patent No.: US 9,377,139 B2
(45) Date of Patent: Jun. 28, 2016

(54) FLANGE LOCK

(76) Inventor: Gilbert C. Ramos, Missioin, TX (US)

( * ) Notice: Subject to any disclaimer, the term of this patent is extended or adjusted under 35 U.S.C. 154(b) by 900 days.

(21) Appl. No.: 13/136,909

(22) Filed: Aug. 15, 2011

(65) Prior Publication Data

US 2012/0038145 A1    Feb. 16, 2012

Related U.S. Application Data

(60) Provisional application No. 61/401,481, filed on Aug. 13, 2010.

(51) Int. Cl.
*F16L 23/00* (2006.01)
*F16B 41/00* (2006.01)

(52) U.S. Cl.
CPC .............. *F16L 23/003* (2013.01); *F16B 41/005* (2013.01)

(58) Field of Classification Search
CPC ..................................... F16L 23/003
USPC ........ 285/80, 368, 412; 411/119, 120; 70/232
See application file for complete search history.

(56) References Cited

U.S. PATENT DOCUMENTS

| 4,095,809 | A | * | 6/1978 | Smith | 277/611 |
| 4,253,509 | A | * | 3/1981 | Collet | 411/214 |
| 4,300,373 | A |   | 11/1981 | Camos | |
| 4,399,833 | A | * | 8/1983 | Holtgraver | F16K 27/0218 137/315.22 |
| 4,405,161 | A |   | 9/1983 | Young | |
| 4,407,146 | A | * | 10/1983 | Nielsen, Jr. | 70/232 |
| 4,480,513 | A | * | 11/1984 | McCauley et al. | 81/436 |
| 4,537,543 | A | * | 8/1985 | Scott et al. | 411/372.5 |
| 4,541,256 | A |   | 9/1985 | Green | |
| 4,571,966 | A | * | 2/1986 | Lopez, Jr. | 70/232 |
| 5,469,724 | A | * | 11/1995 | Pollard | 70/178 |
| 5,954,466 | A | * | 9/1999 | Coffey et al. | 411/119 |
| 6,644,075 | B2 |   | 11/2003 | Thompson | |
| 6,869,081 | B1 | * | 3/2005 | Jenco | 277/611 |
| 7,703,745 | B2 | * | 4/2010 | Dalluge | F16L 23/003 251/148 |
| 2003/0051518 | A1 | * | 3/2003 | Thompson | 70/164 |

* cited by examiner

*Primary Examiner* — James Hewitt

(57) ABSTRACT

A flange lock reduces the likelihood of theft of equipment connected by one or more flanges. The flange lock may include a specialized nut clamping the flanges together, a specialized bolt having a ribbed section to prevent rotation of the bolt, an anti-rotation bracket over a specialized nut or over a conventional nut thereby preventing rotation of the nut and/or a shim between the flanges minimizing the possibility of sawing through a security bolt.

12 Claims, 4 Drawing Sheets

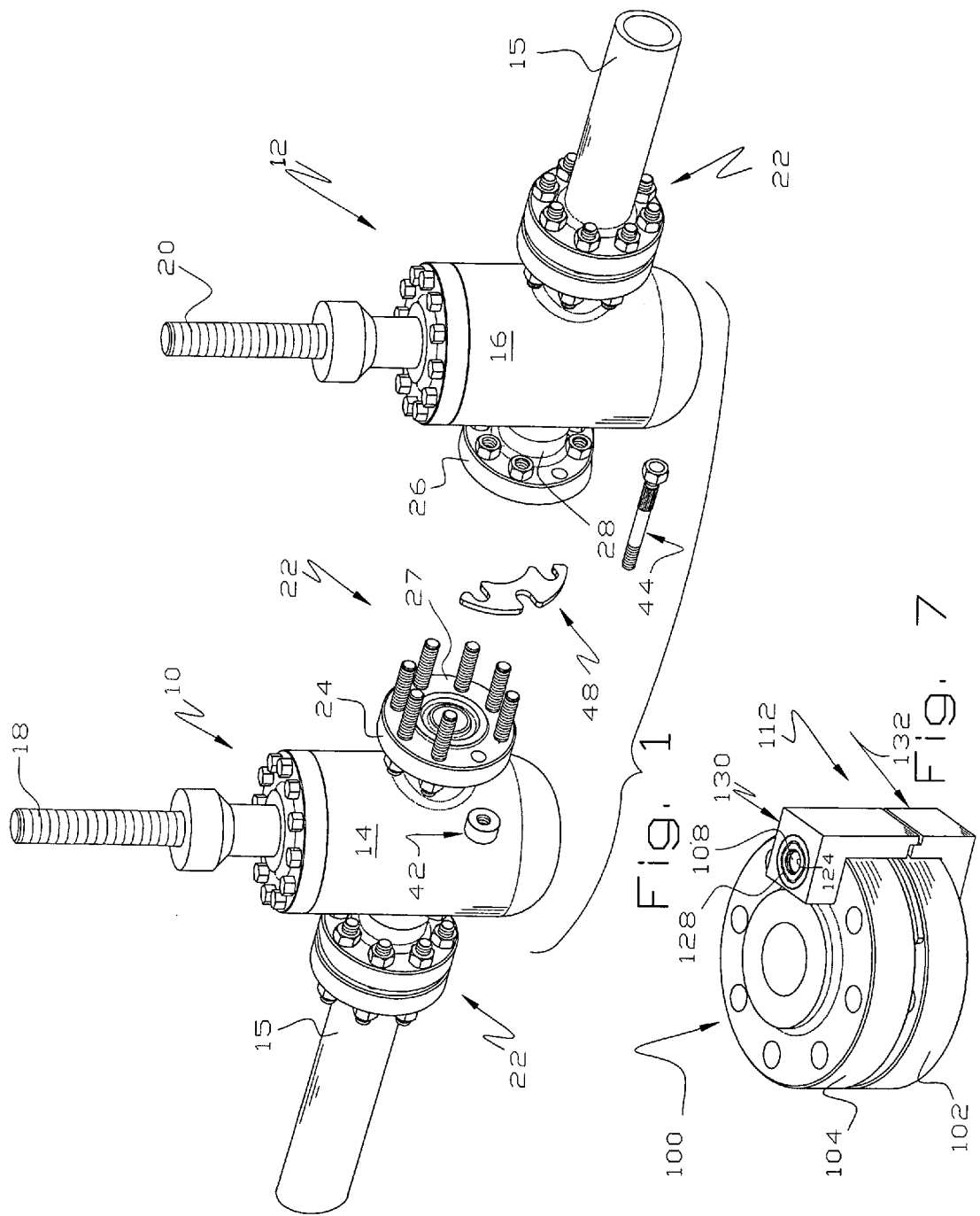

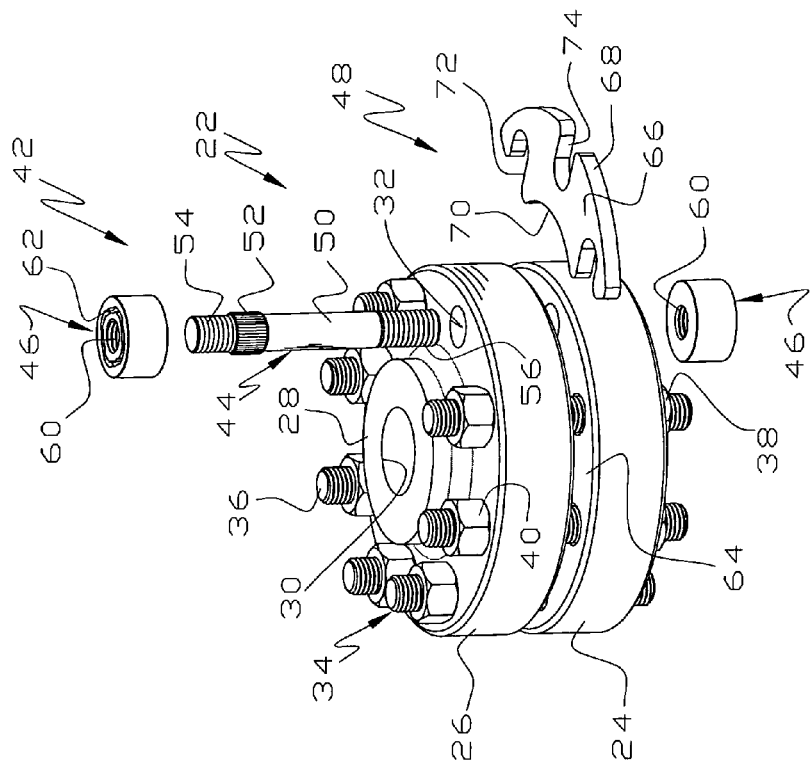
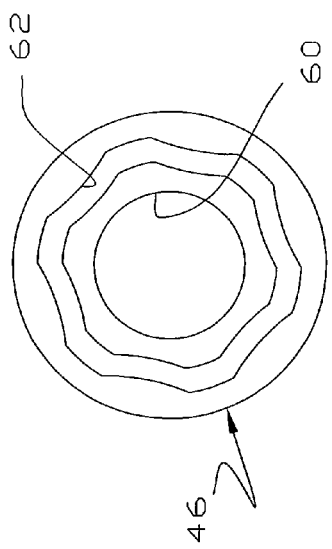
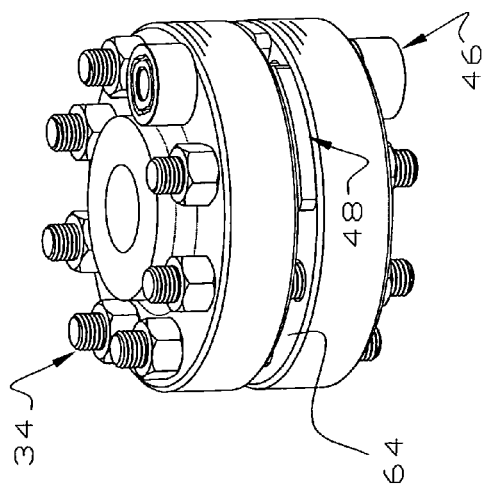

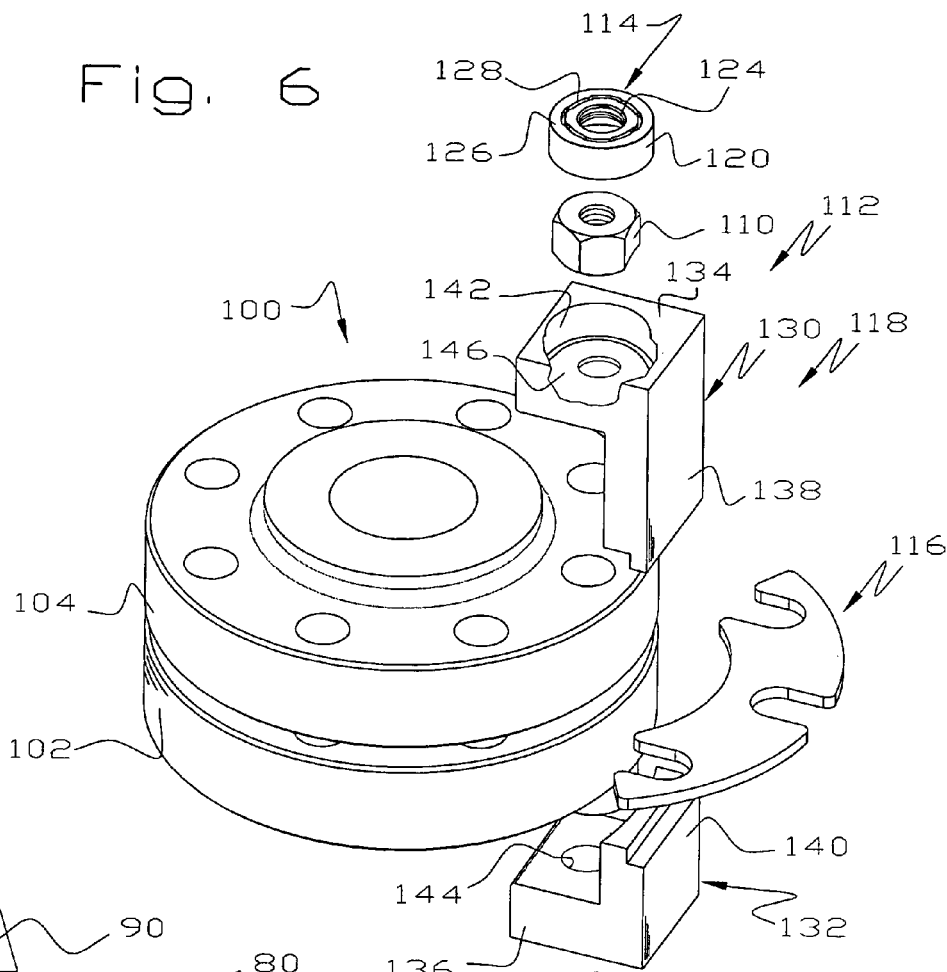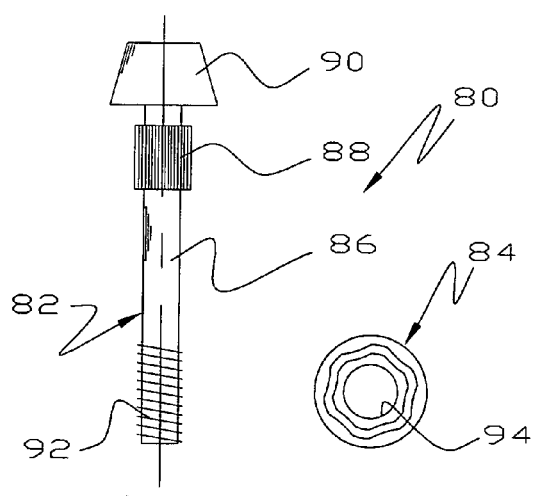

FLANGE LOCK

This application is partially based on U.S. Provisional Application Ser. No. 61/401,481, filed Aug. 13, 2010, priority of which is claimed.

This invention relates to a flange lock such as may be used to prevent theft of equipment that is connected together by flanges.

BACKGROUND OF THE INVENTION

Flange connections are used in a variety of industries and a variety of situations to connect meter run sections together, to connect pipe sections together and to connect valves together in Christmas trees used in oil and gas wells and other applications. A flange connection comprises a pair of essentially identical flanges or discs having a series of bolt holes arranged in a circle near the circumference. Each flange is typically welded to one end of a valve or one end of a pipe section. Conventionally, an all-thread bolt is passed through the bolt holes and conventional nuts compress the flanges together captivating a seal or gasket between the flanges thereby making the connection pressure tight.

Some of the equipment having flange connections is very expensive, such as high pressure valves in Christmas trees used to control the flow of oil or gas from hydrocarbon wells, pipeline valves, meters and meter runs and the like. Much of this type equipment is located in remote rural areas where there is little or no security. Consequently, there is always a risk this equipment can be stolen and either sold as scrap to a recycling yard or to used equipment dealers.

It is accordingly not surprising that several approaches have been suggested in the prior art to secure flange connected equipment against theft as shown in U.S. Pat. Nos. 4,300,373; 4,405,161; 4,480,513; 4,537,543; 4,541,256; 4,571,966 and 6,644,075.

SUMMARY OF THE INVENTION

Several different types of flange locks and flange lock accessories are disclosed. In some of the embodiments, the shape and size of a housing attached to one of the flanges may be used to minimize or prevent access to a special stud or bolt comprising part of the security equipment.

In one set of embodiments, a special stud or bolt can be used as one of the bolts connecting the flanges together. In these embodiments, the bolt is made in such a manner that it is difficult to remove without specialized tools so the flanges cannot be separated without having the specialized tool.

In another set of embodiments, a stud can be used but is passed through one or more generally L-shaped brackets, each of which provides a recess aligned with its associated flange holes. Special nuts can be threaded onto the stud that require a special tool to advance and/or remove so the nut resides in the recess, captivates the bracket to the flange and the nut's periphery is not accessible to a wrench. In some of these embodiments, brackets extend beyond the periphery of the flange and, upon an attempted rotation of the nut, the bracket contacts the flange thereby preventing further rotation of the nut. In embodiments using two brackets, they abut, connect or overlap and prevent the flanges from being separated because the nuts cannot readily be disassembled from the studs.

Many embodiments can incorporate a stud having a ribbed section substantially the same O.D. as the I.D. of the flange bolts holes. The ribs are substantially harder than the metal of the flange so the ribs score the bolt holes when the studs are inserted into the bolt holes. This deforms the flange around the bolt holes and frictionally captivates the stud in its bolt hole. This prevents removal of the stud if one end of the stud is inaccessible and a nut is broken off the other end and also makes the stud non-rotatable thereby acting as a back up in much the same manner that a wrench would.

Many embodiments can incorporate a shim located under the specialized connection to prevent or minimize tilting of one of the flanges relative to the other. This prevents a vertical assembly, such as a Christmas tree, from becoming unstable and also prevents a thief from separating the flanges enough to use a portable bandsaw or hacksaw to cut the threaded stud.

It is an object of this invention to provide an improved flange lock.

Another object of this invention is to provide a flange lock having a specialized stud that can be installed in a flange thereby preventing easy disassembly of the flanges unless one has the appropriate tools.

A further object of this invention is to provide a flange lock incorporating one or more brackets captivated to one of the flange studs in a manner that prevents easy disassembly of the flanges unless one has the appropriate tools.

Another object of this invention is to provide a shim located under a specialized stud to prevent the stud from being cut with a portable saw.

Other objects and advantages of this invention will become more fully apparent as this description proceeds, reference being made to the accompanying drawings.

BRIEF DESCRIPTION OF THE DRAWINGS

FIG. 1 is an exploded isometric view of a flange connection incorporating a flange lock;

FIG. 2 is an exploded isometric view of the flange connection of FIG. 1;

FIG. 3 is an assembled isometric view of the flange connection of FIG. 2;

FIG. 4 is an enlarged end view of a specialty nut;

FIG. 5 is an enlarged side view of another embodiment of a stud used in a flange connection;

FIG. 6 is an exploded isometric view of a flange connection illustrating another embodiment of a flange lock, certain parts being broken away for clarity of illustration;

FIG. 7 is an assembled isometric view of FIG. 6;

DETAILED DESCRIPTION OF THE INVENTION

Figure 8:
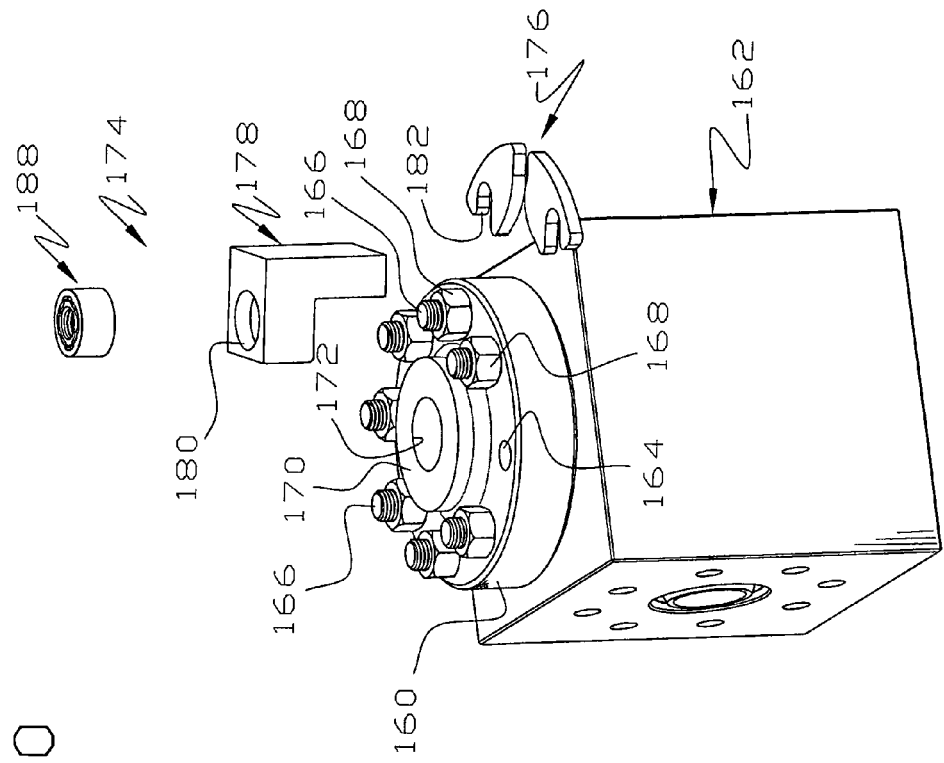
FIG. 8 is an exploded isometric view of a flange connection illustrating another embodiment of a flange lock.

There is disclosed a variety of flange locks and flange lock accessories. These articles are subject to considerable variation depending on the size, shape, material and/or security measures thought necessary for the equipment connected to the flanges and which the flange connects together. The scope of this invention is accordingly dictated by the attached claims.

Referring to FIGS. 1-3, a pair of valves 10, 12 are connected in a more-or-less horizontal pipeline 15 although the valves 10, 12 may be arranged in any suitable manner such as more-or-less vertically, as in a well head assembly or Christmas tree of a hydrocarbon well. The valves 10, 12 may be of a conventional type including a valve housing 14, 16, an internal valve element (not shown) connected to a threaded shaft or valve stem 18, 20 to which is connected a valve wheel (not shown) which can be turned to move the valve element (not shown) to open or close the valve 10, 12. Conventional flange connections 22 comprises first and second adjacent flanges or discs 24, 26 providing a pair of central hubs or stubs 28 which are normally welded or otherwise secured to a valve body 14, 16, other equipment (not shown) or pipe section (not shown) depending on the nature of the equipment connected together by the flange connection 22.

The stubs 28 provide passages 30 though which gases, liquids, mixtures or suspensions flow, all as will be understood by those skilled in the art. The flanges 24, 26 provide a circular array of bolt holes 32 though which, in a conventional arrangement, conventional bolts 34 pass.

The conventional bolts 34 can include an all-thread stud 36 having conventional nuts 38, 40 on opposite ends to compress the flanges 24, 26 together so they provide a fluid tight seal for materials passing through the passages 30. The flanges 24, 26 may incorporate some type arrangement, such as a seal or gasket 27 to provide this seal which typically results in the flanges 24, 26 being spaced slightly apart. The seal 27 may be of any suitable type, either integral with the flanges 24, 26 or a separate component. Those skilled in the art will recognize the valves 12, 14 and flange connections 22, as heretofore described, as being typical of conventional oil field flange connections.

In order to provide a more secure connection between the flanges 24, 26 so it is more difficult for them, and/or the equipment to which they connect, to be stolen, one or more flange locks 42 may be provided on the flange connection 22. In the embodiment of FIGS. 1-3, the flange lock 42 can comprise a stud 44, a pair of specialty nuts 46 and a shim 48.

The stud 44 includes a central shank 50 and can have a ribbed section 52 positioned to fit inside the bolt hole 32 and threads 54, 56 on one or both the ends of the stud 44. The ribbed section 52 is of larger diameter than the shank 50 and can have a slightly larger O.D. than the bolt hole 32 and the stud 44 is harder than the metal of the flange 24 whereby the ribs deform the metal around the bolt hole 32 thereby captivating the stud 44 in its bolt hole 32 and retarding rotation of the stud 44 thereby providing a back up function analogous to having a wrench on one of the nuts 38 while tightening the other nut 40. The stud 44 can preferably be of a material that is sufficiently hard that it cannot be cut with a conventional hacksaw blade, e.g. have a Rockwell C hardness of 58 or greater. This may be accomplished by selecting an alloy that is sufficiently hard or by heat treating an alloy to provide the desired hardness, such as a heat treating technique known as 58-62RC from Texas Heat Treating of Round Rock, Tex.

The nuts 46 can be identical and have female threads 60 extending through the nut 46 to mesh with the threads 54, 56 so the end of the stud 44 may be viewed through the nut 46. In some embodiments, the threads 54, 56, 60 can be left handed rather than conventional right handed threads so an unauthorized person attempting to remove the nuts 46 may be thwarted. Although the periphery of the nuts 46 is illustrated as being cylindrical, they may be of any suitable shape and may be tapered as disclosed hereinafter so a pipe wrench will slip off the nuts 46 rather than turn them. One end of the nuts 46 can include a threading/unthreading attachment which requires a special wrench such as an undulating or irregular groove 62, series of recesses or other arrangement in order to turn the nuts 46. In some embodiments, the groove 62 describes a series of connected undulations allowing the transmission of considerable torque to tighten the nuts 46 as shown best in FIG. 4.

One purpose of the shim 48 is to stabilize the flanges 24, 26 when one removes all of the conventional bolts 34. Thus, the shim 48 does not provide a sealing function. In some situations, the sealing member (not shown) between the flanges 24, 26 separates the flanges 24, 26 enough so that, with only the flange lock 42 remaining, the flanges 24, 26 might be tilted sufficiently to gain access to the shank 50 so it could be cut with a bandsaw. By incorporating the shim 48, the flanges 24, 26 can no longer be tilted so it cannot be cut and prevents a vertical assembly, such as a Christmas tree, from becoming unstable. In addition, the shim 48 also provides an additional thickness of metal in the event a thief should attempt to slide a hacksaw blade through the gap 64 between the flanges 24, 26 and attempt to cut the shank 50. In this regard, it may be preferred to make the shim 48 of a very hard metal, such as one having a Rockwell C hardness of 58 or greater.

To these ends, the shim 48 can include a body 66 having an outer edge 68 of the same curvature as the flanges 24, 26, an inner edge 70 of the same curvature as the outside of the stub 28, a pair of notches, recesses or openings 72 allowing the shim 48 to pass the studs 36 of the adjacent conventional bolts 34 and a opening, notch or recess 74 allowing the stud 44 to pass through the shim 48.

Assembly of the flange lock 42 in lieu of a conventional bolt 34 is believed to be apparent. Before or after the conventional bolts 34 are installed, the shim 48 is positioned so the notch 74 aligns with the bolt holes 32 through which the stud 44 will pass. The stud 44 can be inserted through the aligned bolt holes 32 and notch 74 and the nuts 46 threaded onto the threads 54, 56 and tightened with a specialty socket (not shown) having a periphery to match and be received in the groove 62. In order to disassemble the flange lock 42, one needs the specialty wrench and needs to know which direction the threads 54, 56, 60 extend, i.e. are they left handed or right handed threads.

Referring to FIG. 5, there is illustrated another embodiment of a flange lock 80 including a stud 82 of somewhat different design and a specialty nut 84 which may be the same as the specialty nut 46. In some situations, it may be desired to provide a bolt that is stronger than the stud 44 and specialty nuts 46. To this end, the stud 82 includes a shank 86 which may have a ribbed section 88, a fixed head 90 at one end of the shank 86 and threads 92 at the other. The fixed head 90 may be tapered as illustrated to provide more clearance when attempting to insert the threaded end through aligned bolt holes of some equipment, such as a Christmas tree providing very little room for threading the nuts 46 onto both ends of the stud 44 as shown in FIG. 1. As in the other disclosed embodiments, the threads 92 on the stud 82 and the threads 94 in the nut 84 may be left or right handed. As in the other disclosed embodiments, the ribbed section 88 deforms the metal around the bolt hole 32 when inserted into a bolt hole and thereby provides a back up preventing the stud 82 from turning when the nut 84 is turned. It will be seen that the flange lock 80 may be used in the same manner as the stud 44 and specialty nuts 46 either with or without the shim 48.

The tapered fixed bolt head 90 has several advantages. It allows the construction of a stronger stud because the fixed head 90 is stronger than a threaded nut. It allows the stud 80 to be inserted into bolt holes in situations where there is very little clearance between the flanges and valve bodies and the like adjacent to them. It also is sufficiently tapered that a pipe wrench cannot readily grip it and apply substantial torque to the stud 82. The amount of taper of the fixed bolt head 90 is subject to wide variation. In a particular example, the bolt head 90 has a minimum diameter of 1.242 inches, a maximum diameter of 1.609 inches and a thickness of about ¾". The top of the bolt head 90 may or may not have a groove to accommodate a specialty socket.

Referring to FIGS. 6-7, there is illustrated another flange connection 100 having abutting flanges 102, 104 which can be identical to the flange connection 22 although all of the conventional bolts have been omitted for purposes of illustration except for one bolt 106 having a conventional stud 108 and conventional nut 110. As shown best in FIG. 6, a flange lock 112 is illustrated which differs in several respects from the flange locks 42, 80 and which is similar in some respects.

In one version, the flange lock 112 may be installed over a conventional stud 108 and may include a specialized nut 114, a shim 116 which may be the same as the shim 48 and a rotation preventing device 118. In this version, the nut 114 may have a body 120 providing a cavity 122 and a threaded passage 124 therethrough. The cavity 122 may be of sufficient diameter to receive the nuts 110 and allow the nuts 114 to rotate relative to the nuts 110. In this version, the stud 108 provides a sufficient threaded length to receive the threaded opening 124 so the top of the stud 108 extends near or is coplanar with the top face 126 of the nut body 120. The nut 114 includes a specially formed wrench receiver such as an undulating groove 128.

The rotation preventing device 118 may include a pair of L-shaped brackets 130, 132 having one leg 134, 136 extending over the existing bolt 106 and another leg 138, 140 extending down the sides of the flanges 102, 104. The leg 138 includes a cavity or recess 142 of sufficient size to pass the nut 110 so the ledge or shoulder 146 rests on the flange 102. The leg 140 also includes a similar cavity of sufficient size to pass the nut on the underside of the flange 102 but this cavity is obscured in FIG. 6 under the leg 136. A hole 144 passes through the legs 134, 136 to receive the bolt 108. The nuts 110 accordingly thread onto the bolt 108 and abut the shoulder 148 to captivate the brackets 130, 132 against the flanges 104, 102 respectively. The specialty nuts 114 then thread onto the ends of the bolt 108 sufficiently to move into the cavities 142 so they end up substantially flush with the exposed surface of the bracket legs 134, 136.

The brackets 130, 132 may include notched ends 150, 152 which interfit and which allow some variation in the thickness of the flanges 102, 104. In the alternative, the ends of the brackets 130, 132 may terminate before reaching the adjacent bracket because the purpose of the brackets is to prevent rotation of the nuts 110, 114 which is accomplished because the brackets 130, 132 cannot rotate beyond the edge of the flanges 102, 104. The brackets 130, 132 can accomplish this independently or acting together. It will also be seen that the legs 134, 136 of the brackets 130, 132 may be of sufficient size that the prevent rotation of the nuts adjacent to the legs 134, 136 because the legs 134, 136 are of sufficient size that an open end wrench (not shown) cannot get on the nut. In other words, the legs 134, 136 can be so close to the adjacent nuts that no wrench can get purchase on the nut. In a similar manner, the legs 134, 136 can be so close to the adjacent nuts that the flats of the nuts 110 have to face the legs 134, 136 for the brackets 130, 132 to fit. In this situation, the nuts 110 cannot rotate because the edge between the flats contacts the legs 134, 136 thereby preventing rotation of the nuts 110.

The nuts 114 may be slightly different than the nuts 46 because they thread onto only the exposed top of the threaded stud 108 and attach the brackets 130, 132 to the stud 108 and also clamp the flanges 102, 104 together. To this end, the recesses 122 are of sufficient size to pass over the nut 110 when the nuts 110, 114 are tightened so the top of the nut 114 is more-or-less flush with the top of the leg 134 as shown in FIG. 6. The same thing can be accomplished by providing a thinner nut, which is acceptable because the main function of the nuts 114 is to make access to the nuts 110 more difficult, i.e. the nuts 114 do not clamp the flanges 102, 104 together. The shim 116 may be identical to the shim 36 if the shim 116 is installed before the bolt 108. Although the brackets 130, 132 are illustrated as being used with a conventional bolt 108, it is apparent that in some situations, the anti-rotation brackets 130, 132 may be used with the bolt 44.

Assembly of the flange lock 112 should now be apparent. The existing bolt 108 is removed. The remaining bolts (not shown) need not be removed. The shim 116 is inserted between the flanges 102, 104 and around the existing bolts (not shown). The bolt 108 onto which the flange lock 112 is to be placed may be replaced by a hardened stud that cannot be cut by a hacksaw. The brackets 130, 132 are placed over the bolt 108 and the nuts 110 tightened onto the threaded end of the bolt 108. This contributes to clamping the flanges 102, 104 together and clamps the brackets 130, 132 to the flange connection 100. Then, the nuts 114 are threaded onto the ends of the bolt 108 until they are generally flush with the exposed surface of the legs 134, 136 thereby making access to the nuts 110 difficult.

In another version, the flange lock 112 can use the nuts 46 to clamp the flanges 102, 104 together rather than use the nuts 110 for this purposes.

Figure 9:
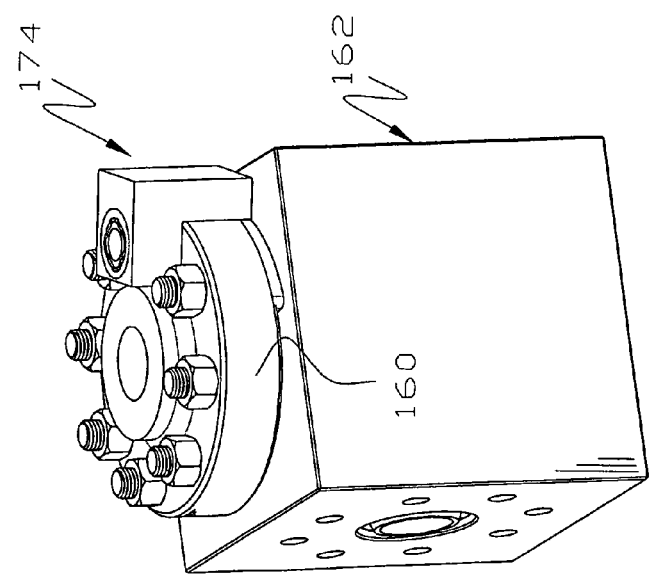
FIG. 9 is an assembled isometric view of FIG. 8.

Although not common, there are some situations where a flange directly connects to an object rather than to another flange. This is shown in FIGS. 8-9 where a flange 160 of a gate valve or other similar device connects to a flow tee 162 of a Christmas tree. The flange 160 includes a series of bolt holes 164 receiving conventional bolts 166 and nuts 168 to clamp the flange 160 to the flow tee 162. The flange 160 includes a hub 170 welded to a pipe, valve or similar object and provides a passage 172 for delivering gases or liquids through the flow tee 162 and through the flange 160.

Figure 10:
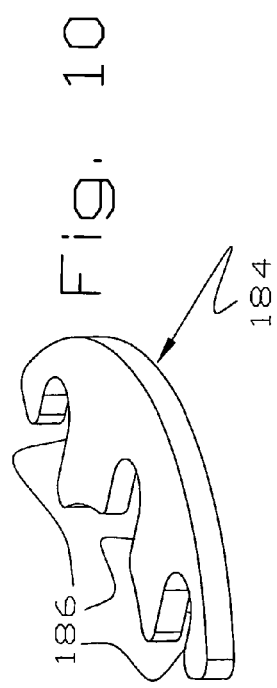
FIG. 10 is an isometric view of another embodiment of a shim used with the disclosed device.

A flange lock 174 may be attached to the flange 160 and may be analogous to the lock 112 because it may include a bracket 176 connected to one of the bolts 166. The flange lock 174 differs from the flange lock 112, in one aspect, because there is a single flange 160 connected to the flow tee 162. In other words, the bolts 166 thread directly into the flow tee 162. Because there is not so much risk of tilting, the flange lock 174 may be installed without removing the bolt 166. To this end, the shim 178 can be of different configuration, e.g. of two part construction straddling the bolt 166 or as illustrated in FIG. 10.

The bracket 176 can be the same as the bracket 130, where the nut 168 secures the bracket 176 to the flow tee 162. In the alternative as shown in FIG. 8, the bracket 176 may be designed to fit over the existing bolt 166 and nut 168 to allow the bracket 176 to be used in situations where there is very little clearance between the flow tee 162 and the valve (not shown) or other object secured to the stub 170. To this end, the bracket 176 provides a recess to receive the bolt 166 and nut 168. The bracket 176 also includes a recess 180 which receives a security nut 188 which threads onto the top of the bolt 166 thereby clamping the bracket 176 to the flange 160. In this situation, the bracket 176 can simply be slipped over the existing bolt 166 and nut 168. The shim 178 may include notches 182 to receive the adjacent bolts 166. It may be desirable to attach the flange lock 174 without removing the bolt 166. To this end, the shim 178 may be of two parts as shown in FIG. 9 or be a one piece device 184 as shown in FIG. 10 with multiple notches 186 facing in the same direction. In this manner, the shims 178, 184 may be inserted under the flange 160 without removing the bolt 166.

Assembly of the flange lock 174 of FIG. 8 should now be apparent. Rather than remove any of the bolts 116 from the flow tee 162, one bolt 166 is selected to receive the flange lock 174. As shown in FIG. 8, the bracket 176 is simply installed over the nut 166. One of the shims 178, 184 may be inserted between the flange 160 and the flow tee 162. The nut 188 is threaded onto the end of the bolt 166 using a specialized wrench (not shown).

The nuts 46, 114, 188, the shims 46, 116, 178, 184, the studs 44, 82 and/or the brackets 130, 132, 176 can preferably be of a material that is sufficiently hard that it cannot be cut with a conventional hacksaw blade, e.g. have a Rockwell C hardness of 58 or greater. One unusual aspect of the shims being harder than the metal of the flange is that an attempt to cut the shim with a saw will cause the saw to move into the crease between the shim and the flange and then into the flange, meaning that a lot of material has to be cut to remove the security fastener and meaning that the flange will only be worth salvage prices because it cannot be sold or redressed for use as a flange. This also acts to reduce theft because the stolen item is not of substantial value. Bevelling or tapering the shims on their outside edges will also cause a saw to cut the flange and thereby damage it.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention.

I claim:

1. A flange connection comprising an object and a flange having a series of aligned bolt holes, a series of threaded bolts extending through the flange into the object with a threaded fastener on at least one end of each bolt clamping the flange and object together and a seal between the object and flange,
   at least one of the threaded fasteners comprising an anti-theft nut having an irregular wrench connection for tightening the anti-theft nut onto its bolt, the irregular wrench connection requiring an irregular wrench for tightening the anti-theft nut onto its bolt,
   a metallic shim captivated between the flange and the object adjacent the anti-theft nut whereby the bolt of the anti-theft nut is more difficult to saw in two, the shim extending around less than the periphery of the flange, there being areas around the periphery of the flange with no shim,
   the shim being separate from the seal; and
   an anti-rotational bracket captivated between the anti-theft nut and the flange, the bracket comprising
      a section providing a recess wholly receiving the anti-theft nut and exposing the irregular wrench connection, the section extending beyond a periphery of the flange and
      an arm on the section extending generally in the direction of the bolts so that rotation of the bracket causes the bracket to contact the flange thereby preventing rotation of the bracket and anti-theft nut.

2. The flange connection of claim 1 wherein the object is a flange.

3. The flange connection of claim 1 wherein at least some of the bolts are threaded on each end and have a nut on each end.

4. The flange connection of claim 1 wherein the irregular wrench connection comprises an undulating annular groove in the nut.

5. The flange connection of claim 1 wherein the shim comprises an outer edge adjacent an outer edge of the flange and an inner edge, the shim comprising at least two openings each of which receives a bolt.

6. The flange connection of claim 5 wherein at least one of the openings opens through the outer edge of the shim and at least one of the openings opens through an inner edge of the shim.

7. A flange connection comprising an object and a flange having a series of aligned bolt holes, a series of threaded bolts extending through the flange with a threaded fastener on at least one end of each bolt clamping the flange and object together and a seal between the flange and the object,
   at least one of the threaded fasteners comprising an anti-theft nut having an irregular slot in one end thereof for tightening the anti-theft nut onto its bolt, the irregular slot requiring an irregular ribbed wrench for tightening the anti-theft nut onto its bolt, and
   an anti-rotational bracket captivated between the anti-theft nut and the flange, the bracket comprising
      a section providing a recess wholly receiving the anti-theft nut and exposing the irregular slot, the section extending beyond a periphery of the flange and
      an arm on the section extending generally in the direction of the bolts so that rotation of the bracket causes the bracket to contact the flange thereby preventing rotation of the bracket and anti-theft nut,
   a metallic shim captivated between the flange and the object adjacent the anti-theft nut whereby the bolt of the anti-theft nut is more difficult to saw in two, the shim extending around less than the periphery of the flange, there being areas around the periphery of the flange with no shim,
   the shim being separate from the seal.

8. The flange connection of claim 7 wherein the object is a flange.

9. The flange connection of claim 7 wherein at least some of the bolts are threaded on each end and have a nut on each end.

10. The flange connection of claim 7 wherein the irregular wrench connection comprises an undulating annular groove in the nut.

11. The flange connection of claim 7 wherein the shim comprises an outer edge adjacent an outer edge of the flange and an inner edge, the shim comprising at least two openings each of which receives a bolt.

12. The flange connection of claim 11 wherein at least one of the openings opens through the outer edge of the shim and at least one of the openings opens through an inner edge of the shim.

* * * * *